United States Patent
Srinivas et al.

(10) Patent No.: US 7,103,034 B1
(45) Date of Patent: Sep. 5, 2006

(54) APPROACH FOR TRACKING INTERNET PROTOCOL TELEPHONY DEVICES IN NETWORKS

(75) Inventors: Muktevi Srinivas, Bangalore (IN); Jagannathan Shiva Shankar, Bangalore (IN); Damodar Patakolusu, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1013 days.

(21) Appl. No.: 10/143,648

(22) Filed: May 9, 2002

(51) Int. Cl.
*H04L 12/66* (2006.01)

(52) U.S. Cl. ............... 370/352; 370/254; 709/224; 379/32.01

(58) Field of Classification Search ............... None
See application file for complete search history.

(56) References Cited

U.S. PATENT DOCUMENTS

| | | | |
|---|---|---|---|
| 5,754,552 A | 5/1998 | Allmond et al. | |
| 5,828,864 A | 10/1998 | Danknick et al. | |
| 5,923,663 A | 7/1999 | Bontemps et al. | |
| 5,937,035 A * | 8/1999 | Andruska et al. | 379/32.03 |
| 7,010,110 B1 * | 3/2006 | Jorasch et al. | 379/207.04 |

* cited by examiner

*Primary Examiner*—Bob A. Phunkulh
(74) *Attorney, Agent, or Firm*—Hickman Palermo Truong & Becker LLP

(57) ABSTRACT

An approach for tracking IP telephony devices in a network generally involves detecting changes in physical connections of IP telephony devices to the network by evaluating address data for the IP telephony devices. Address data for the telephony devices is evaluated over time to detect changes that have occurred in physical connections. Status data is generated and provided to a network manager application that notifies administrative personnel of the changes. Other embodiments include verifying that a physical connection has changed after an initial detection by waiting a specified amount of time and then evaluating additional address data to determine whether the change still exists.

30 Claims, 4 Drawing Sheets

APPROACH FOR TRACKING INTERNET PROTOCOL TELEPHONY DEVICES IN NETWORKS

FIELD OF THE INVENTION

This invention relates generally to Internet Protocol (IP) telephony, more specifically, to an approach for tracking IP telephony devices in networks.

BACKGROUND OF THE INVENTION

The approaches described in this section are approaches that could be pursued, but not necessarily approaches that have been previously conceived or pursued. Therefore, unless otherwise indicated, the approaches described in this section are not prior art to the claims in this application and are not admitted to be prior art by inclusion in this section.

IP telephony is a technology that allows voice telephone calls to be made over the worldwide packet data communications network known as the "Internet" without traversing the traditional public switched telephone network (PSTN). The increased availability of low cost Internet access and inexpensive IP telephony devices make using the Internet for telephone calls particularly attractive for end users. Moreover, aside from the cost of Internet access, transmitting data over the Internet is free for end users.

Because of the benefits of IP telephony, some business organizations have installed IP telephones ("IP phones") that use a business organization's intranet for internal calls and the Internet for external calls. Each IP phone is a node on the network and has its own IP address and Media Access Control (MAC) layer address. A call manager manages calls in a manner similar to the way a switch manages calls in a conventional private branch exchange (PBX) and PSTN arrangement.

IP phone arrangements provide several advantages over conventional PBX arrangements. First, business organizations can use their existing broadband Internet access to make external calls, so additional Internet access connections are generally not required. Second, recurring costs can be significantly lower in IP phone arrangements since local and long distance telephone service charges are avoided completely. Although there is a capital expense required to purchase the IP phones, the long-term savings can easily exceed this expense. Third, IP phones are very mobile since the phone extension and privileges are associated with the physical IP phone, instead of a physical connection. Thus, IP phones can be physically moved within an organization and the IP phones retain their phone extensions and privileges.

Despite the advantages provided by IP phone arrangements over conventional PBX arrangements, IP phone arrangements do have some drawbacks. One problem is that unauthorized individuals can obtain and move an IP phone to another location and then access all of the privileges associated with the IP phone. This problem may be more prevalent in medium and large size organizations that have large numbers of IP phones that are difficult to track. Another problem is that IP phones are subject to being "hacked" by devices that have connectivity to the Internet and that "spoof" the MAC address of the IP phones. Such devices are sometimes referred to as "phantom" phones.

Based upon the foregoing, there is a need for an approach for tracking IP telephony devices in networks. There is a particular need for an approach for tracking IP phones in networks that detects changes in physical connections of IP phones. There is yet a further need for an approach for tracking IP phones in networks that includes reporting of changes in physical connections of IP phones.

SUMMARY OF THE INVENTION

According to one aspect of the invention, an approach is provided for tracking an Internet Protocol (IP) telephony device connected to a network. According to this approach, first address data is received that specifies a physical connection of the IP telephony device to the network at a first point in time. Second address data is also received that specifies a physical connection of the IP telephony device to the network at a second point in time that is after the first point in time. The approach also includes determining, based upon the first address data and the second address data, whether the physical connection of the IP telephony device to the network has changed over time. If the physical connection of the IP telephony device to the network has changed over time, then status data is generated that indicates that the physical connection of the IP telephony device to the network has changed over time.

Another aspect of the invention includes providing the status data to a network manager, which processes the status data and notifies administrative personnel of the change in the physical connection of the IP telephony device. According to other aspects of the invention, the first and second address data may be either received from a network switch to which the IP telephony device is attached, or requested from the network switch.

According to yet another aspect of the invention, third address data is received that specifies a physical connection of the IP telephony device to the network at a third point in time that is after the second point in time. Furthermore, the status data indicating that the physical connection of the IP telephony device to the network has changed over time is generated only if both the second address data and the third address data indicate, relative to the first address data, that the physical connection of the IP telephony device to the network has changed over time.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. DETECTING CHANGES IN PHYSICAL CONNECTIONS
III. STATUS DATA AND REPORTING
IV. IP PHONE CONFIGURATION DATA AND REGISTRATION REQUESTS
V. IMPLEMENTATION MECHANISMS

I. Overview

An approach for tracking IP telephony devices in a network generally involves detecting changes in physical connections of IP telephony devices to the network by evaluating address data for the IP telephony devices. According to one embodiment, the address data for the IP telephony devices is evaluated over time to detect changes that have occurred in the physical connections. Status data is generated and provided to a network manager application that notifies administrative personnel of the changes.

Figure 1A:
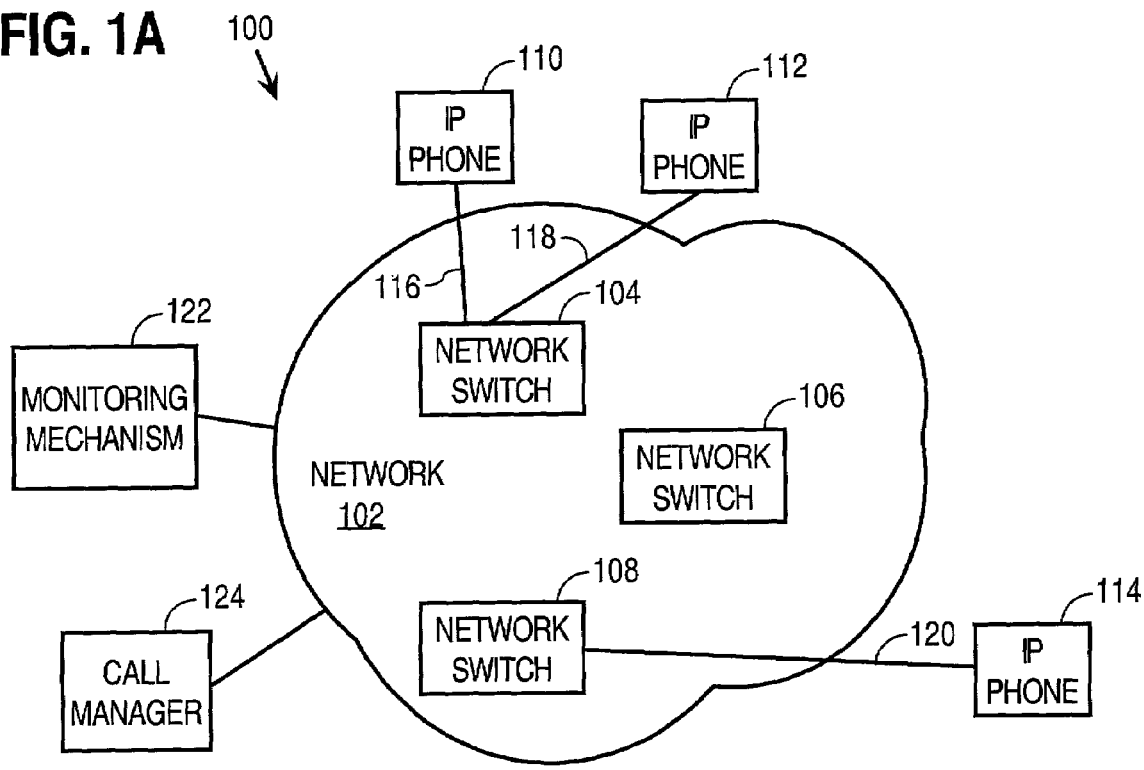
FIG. 1A is a block diagram that depicts a network and a monitoring mechanism for tracking an IP phone that is connected to the network.

FIG. 1A is a block diagram of a network arrangement 100 on which embodiments of the invention may be implemented. Network arrangement 100 includes a network 102 that includes network switches 104, 106, 108. Network 102 may be any type of network and the invention is not limited to any particular type of network. Examples of network 102 include, without limitation, the Internet, a Wide Area Network (WAN), a Local Area Network (LAN), any type of enterprise network, or any combination of the foregoing. Network switches 104, 106, 108 may be any type of network switch depending upon the requirements of a particular application. Examples of network switches 104, 106, 108 include, without limitation, layer 2 and layer 3 switches. Network 102 may include other components that are not depicted in FIG. 1A for purposes of explanation. Examples of other components that may be included in network 102 include, without limitation, other switches, routers, hubs and gateways.

Network arrangement 100 also includes IP phones 110, 112, 114 that are communicatively coupled to network switches 104, 106, 108. As depicted in FIG. 1A, IP phones 110, 112 are communicatively coupled to network switch 104 via links 116, 118, respectively. IP phone 114 is communicatively coupled to network switch 108 via link 120.

Links 116, 118, 120 may be implemented by any medium or mechanism that provides for the exchange of data between IP phones 110, 112, 114 and their respective network switches 104, 106, 108. Examples of links 116, 118, 120 include, without limitation, a network such as a Local Area Network (LAN), Wide Area Network (WAN), Ethernet or the Internet, or one or more terrestrial, satellite or wireless links. For purposes of brevity, links 116, 118, 120 are depicted in FIG. 1A as direct connections between IP phones 110, 112, 114 and their respective network switches 104, 106, 108. However, links 116, 118, 120 do not have to be physically direct links and may involve connections through any number of network elements, for example network switches, hubs and routers, that are not depicted in FIG. 1A.

According to one embodiment, a monitoring mechanism 122 is configured to track IP phones 110, 112, 114 in network 102 by evaluating address data for IP phones 110, 112, 114. Based upon changes in address data for IP phones 110, 112, 114, monitoring mechanism 122 determines whether the physical connections of IP phones 110, 112, 114 to network 102 have changed, e.g., whether IP phones 110, 112, 114 have been physically disconnected or reconnected to network 102, or moved in network 102. According to another embodiment, monitoring mechanism 122 is further configured to store, e.g., to a non-volatile memory, address information for IP phones 110, 112, 114 so that address information for different periods of time can be compared. Monitoring mechanism 122 may also be configured to store other information about IP phones 110, 112, 114, such as IP phone identification information.

According to another embodiment, monitoring mechanism 122 is configured to generate status data based upon results of evaluating the address data and the requirements of a particular application. For example, monitoring mechanism 122 may generate status data that indicates that an IP phone 110, 112, 114 has been physically disconnected from network 102. As another example, monitoring mechanism 122 may generate status data that indicates that the physical connection of an IP phone 110, 112, 114 has been changed from one physical address to another physical address on network 102.

Monitoring mechanism may provide the status data to a call manager 124 to alert administrative personnel that a particular IP phone has been disconnected and may have been stolen, or that the physical connection has changed. Call manager 124 manages IP phones 110, 112, 114 and IP calls made over network 102. For example, call manager 122 assigns and manages extensions and IP addresses for IP phones 110, 112, 114. Thus, call manager 122 manages the logical aspects of IP phones 110, 112, 114 and maintains logical data that specifies the logical attributes of IP phones 110, 112, 114. Call manager 124 may update its own configuration data in response to receiving the status data from monitoring mechanism 122. The administrative personnel would then investigate the matter further and take any necessary steps to address the situation. An example of a suitable call manager 124 is Cisco CallManager, from Cisco Systems, Inc., San Jose, Calif. Monitoring mechanism 122 may also be configured to store the status data, e.g., to a non-volatile memory, such as a disk. For purposes of explanation, call manager 124 is depicted in the figures as being separate from and external to network 102 and its constituent elements. The invention, however, is not limited to this context, and call manager 124 may be implemented internal to network 102 and may be integrated into elements of network 102, such as network switches 104, 106, 108.

Monitoring mechanism 122 may be any type of mechanism for implementing the functionality described herein. Monitoring mechanism may be implemented, for example, using computer hardware, computer software, or any combination of computer hardware and software and the invention is not limited to any particular implementation. Furthermore, monitoring mechanism 122 is depicted and described as being physically disposed external to network 102 only for purposes of explanation. Monitoring mechanism 122 may be included in network 102 as a separate mechanism within network 102, or included in any other network elements, for example, switches, routers or hubs. Further, for purposes of illustrating a clear example, in FIG. 1A only three (3) IP phones and network switches are illustrated; however, in other embodiments there may be any number of such network elements.

II. Detecting Changes in Physical Connections

According to one embodiment, changes in physical connections of IP telephony devices are identified based upon changes in address data that specifies how IP telephony devices are physically connected to a network. As depicted in FIG. 1A, IP phone 112 is physically connected to network 102 via network switch 104. In this situation, address data for IP phone 112 specifies that IP phone 112 is connected to network 102 via network switch 104. The address data may specify a particular address on network switch 104 to which IP phone 112 is connected. Alternatively, the address data may specify a port on network switch 104 to which IP phone 112 is connected. Address data may specify both an address and port to which an IP telephony device is connected. Address data may also include a time attribute that indicates a particular time associated with a physical connection. The time attribute may be useful for analyzing how physical connections change over time as described in more detail hereinafter.

Figure 1B:
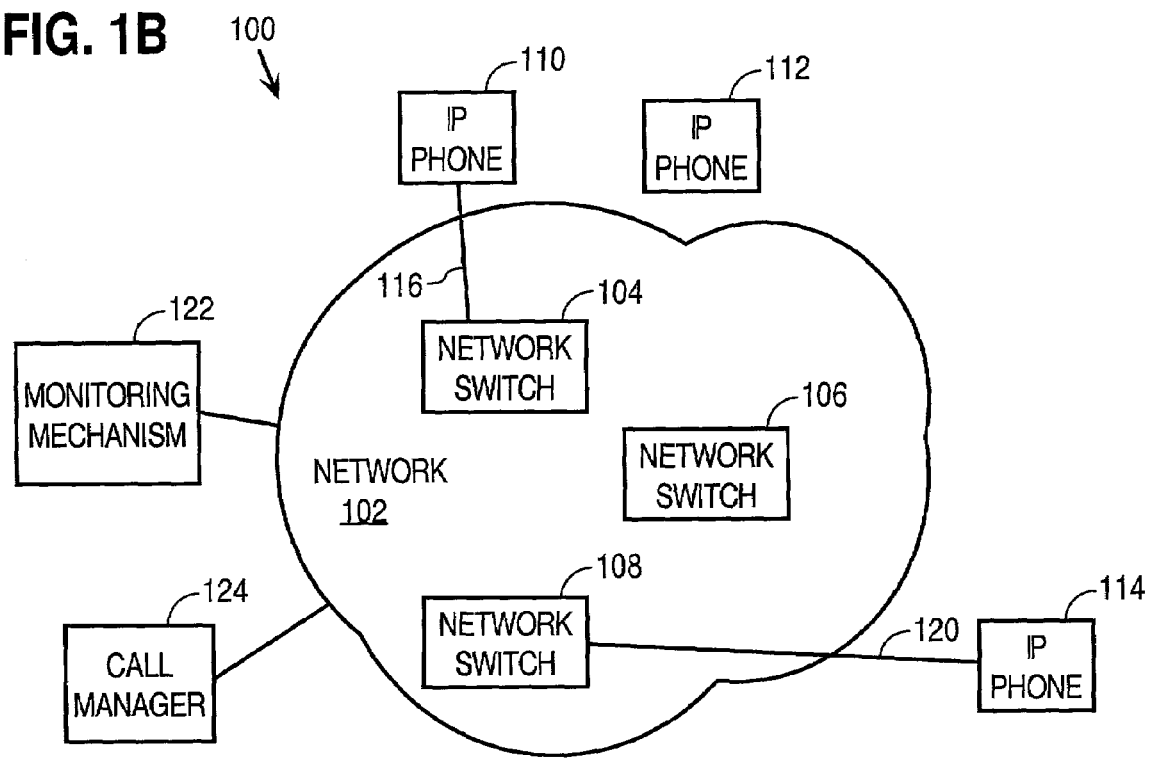
FIG. 1B is a block diagram that depicts a network and a monitoring mechanism for tracking an IP phone that has been disconnected from the network.

As depicted in FIG. 1B, IP phone 112 is no longer physically connected to network 102. IP phone 112 may have been unplugged or otherwise disconnected from network 102, or there may have been a change in link 118. In this situation, the address data for IP phone 112 indicates that IP phone 112 is no longer physically connected to network switch 104. For example, the address data for IP phone 112 may no longer specify a physical address of or port of network switch 104 to which IP phone 112 is connected.

Figure 1C:
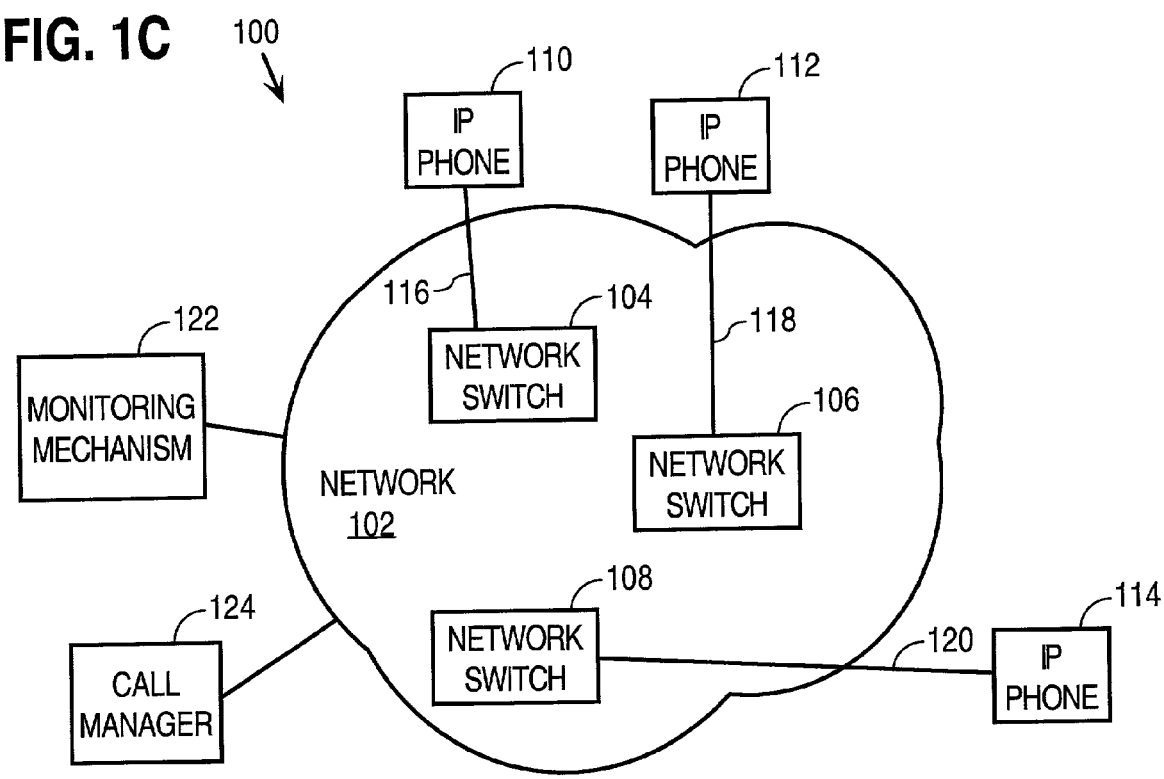
FIG. 1C is a block diagram that depicts a network and a monitoring mechanism for tracking an IP phone that has been reconnected to the network.

As depicted in FIG. 1C, IP phone 112 has been reconnected to network 102 via network switch 106. The address data for IP phone 112 now indicates that IP phone 112 has been reconnected to network 102 via network switch 106. For example, the address data may specify a different address and/or port of network switch 106 to which IP phone 112 is connected.

According to one embodiment, address data is automatically generated and provided by network devices. For example, network switches 104, 106, 108 may be configured to automatically generate and provide address data to monitoring mechanism 122. Network switches 104, 106, 108 may also be configured to automatically generate and provide address data in response to a change to a physical connection of an IP telephony device.

For example, network switch 104 may be configured to provide, to monitoring mechanism 122 over network 102, address data that specifies a physical connection to network 102 for IP phone 112 when IP phone 112 is first connected to network 102. Furthermore, when IP phone 112 is disconnected from network 102, as depicted in FIG. 1B, then network switch 104 generates, and provides to monitoring mechanism 122, updated address data that indicates that IP phone 112 is no longer connected to network 102. When IP phone 112 is reconnected to network 102 via network switch 106, as depicted in FIG. 1C, then network switch 104 again generates and provides to monitoring mechanism 122 updated address data that indicates that IP phone 112 is connected to network 102 via network switch 106. As previously mentioned, the updated address data may specify a switch address, a port, or both.

As an alternative to generating and providing address data in response to detecting changes in physical connections, network switches 104, 106, 108 may be configured to periodically generate and provide address data based upon the expiration of a specified amount of time, or at specified absolute times, depending upon the requirements of a particular application. This may be performed irrespective of whether any physical connections are known to have changed. For example, network switch 104 may be configured to generate and provide, once per second or at any other suitable time interval, address data that specifies the physical connection of IP phone 112 to network 102. Alternatively, network switch 104 may be configured to generate and provide the address data for IP phone 112 at specified times.

It should be noted that the manner in which network switches are configured to generate and provide address data may vary from network switch to network switch and may vary depending upon the requirements of a particular application.

According to another embodiment, monitoring mechanism 122 requests ("polls") address information from network switches 104, 106, 108 and the address information is generated and provided by network switches 104, 106, 108 in response to the requests. Monitoring mechanism 122 may selectively poll address information from particular network switches or poll all network switches in a network. Polling may be performed in addition to any address data that may be automatically generated and provided by network switches.

Figure 2:
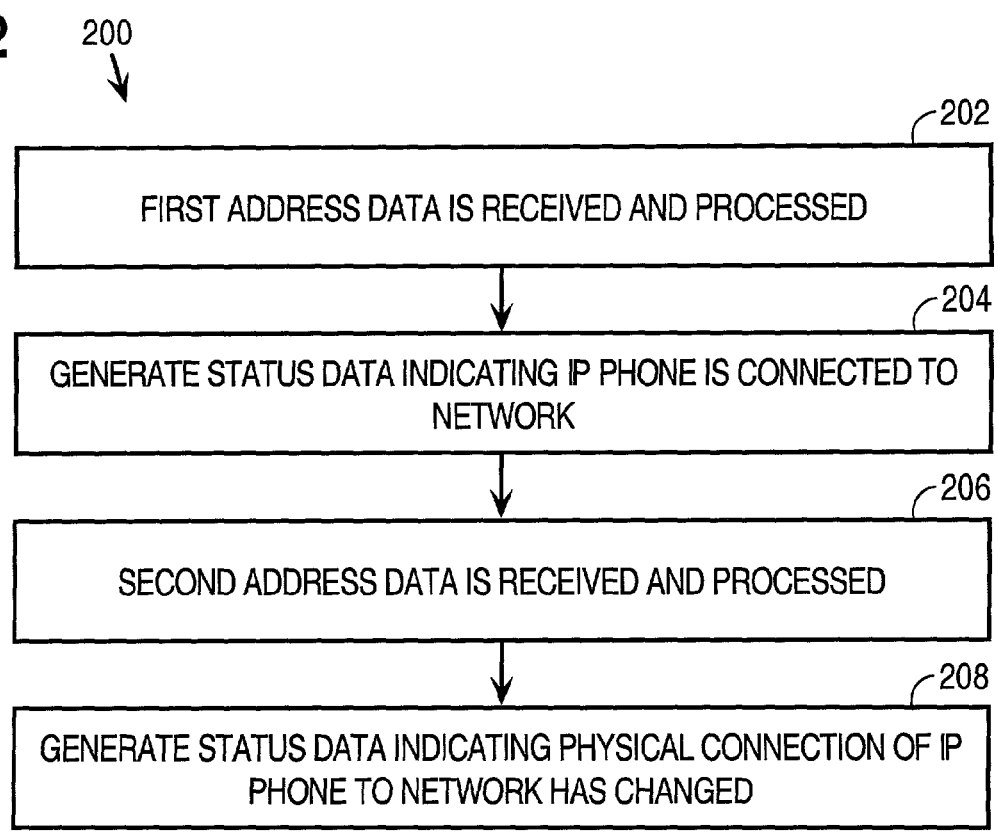
FIG. 2 is a flow diagram that depicts an approach for tracking IP telephony devices in a network.

FIG. 2 is a flow diagram 200 that depicts an approach for tracking IP phones in a network, according to an embodiment. Flow diagram 200 is described in the context that IP phone 112 initially is not physically connected to network 102.

In step 202, monitoring mechanism 122 receives first address data is received in response to IP phone 112 being added to network 102. The first address data specifies the new physical connection of IP phone 112 to network 102. In this situation, since IP phone 112 is connected to network switch 104, the first address data specifies a particular switch address, port, or both, to which IP phone 112 is connected. The first address data may be automatically generated and provided to monitoring mechanism 122 by network switch 104. Alternatively, the first address data may be requested from network switch 104 by monitoring mechanism 122. Monitoring mechanism 122 may save the first address data, for example to a non-volatile storage.

In step 204, monitoring mechanism 122 generates status data based upon the initial connection of IP phone 112 to network 102. The status data may specify the particulars of the connection of IP phone 112 to network 102. For example, the status data may specify the switch address and port of network switch 104 to which IP phone 112 is connected. Monitoring mechanism 122 may also provide the status data to call manager 124 for processing.

Call manager 124, in response to receiving the status data from monitoring mechanism 122, may in turn generate additional status data and/or notify administrative personnel that IP phone 112 has been connected to network 102. For example, call manager 124 may generate an alert or other visual or audible cue or signal on a graphical user interface (GUI), writing an entry in a log file, etc. Call manager 124 may also perform additional processing based upon the status data. For example, call manager 124 may check the address and/or port specified in the status data against a specified address and/or port, e.g., from a work order request, to verify whether IP phone 112 was connected to network 102 at the correct location. Call manager 124 may also update its own records to indicate the current connection particulars of IP phone 112 to network switch 104.

In step 206, monitoring mechanism 122 receives second address data in response to IP phone 112 being disconnected from network 102. The second address data specifies the current physical connection of IP phone 112 to network 102 at a point in time that is after the point in time associated with the first address data. In this situation, the second address data specifies that IP phone 112 is no longer physically connected to network 102. The second address data may be generated in response to a change in the physical connection of IP phone 112 to network switch 104. Alternatively, the second address data may be periodically generated, regardless of whether a change in the physical connection of IP phone 112 to network switch 104 has occurred.

In step 208, monitoring mechanism 122 generates status data, if appropriate, based upon a comparison of the first address data with the second address data. For example, monitoring mechanism 122 may not generate any status data if the comparison of the first and second address data indicates that there has not been a change in the physical connection state of IP phone 112. In the present example, the second address data indicates that IP phone 112 is no longer connected to network 102. In this situation, monitoring mechanism 122 generates status data that indicates that IP phone 112 is no longer connected to network 102.

Monitoring mechanism 122 may also provide the status data to call manager 124 for processing. Call manager 124 may, in response to receiving the status data from monitoring mechanism 122, generate additional status data and/or notify administrative personnel that IP phone 112 is no longer connected to network 102. This may include, for example, generating an alert or other visual or audible cue or signal on a GUI, writing an entry in a log file, etc.

III. Status Data and Reporting

In general, status data may be generated whenever address data is available, or in response to specified events or criteria. For example, status data may be generated each time address data is available to report the current status of IP telephony devices. In this situation, monitoring mechanism 122 generates status data in response to receiving updated address data for a particular network switch. For example, after IP phone 112 is no longer connected to network 102, as depicted in FIG. 1B, monitoring mechanism 122 generates status data that indicates that IP phone 112 is no longer physically connected to network 102. Monitoring mechanism 122 may provide the status data to call manager 124 that processes the status data appropriately, for example by notifying administrative personnel via a GUI.

As another example, monitoring mechanism 122 may not immediately generate status data when address data indicates that an IP telephony device is no longer connected to a network. Instead, monitoring mechanism 122 may wait a specified amount of time and then again check the address data for the IP telephony device. If the address data indicates that the IP telephony device is still disconnected from the network, then monitoring mechanism 122 generates the status data indicating that the IP telephony device is no longer connected to the network.

Figure 3:
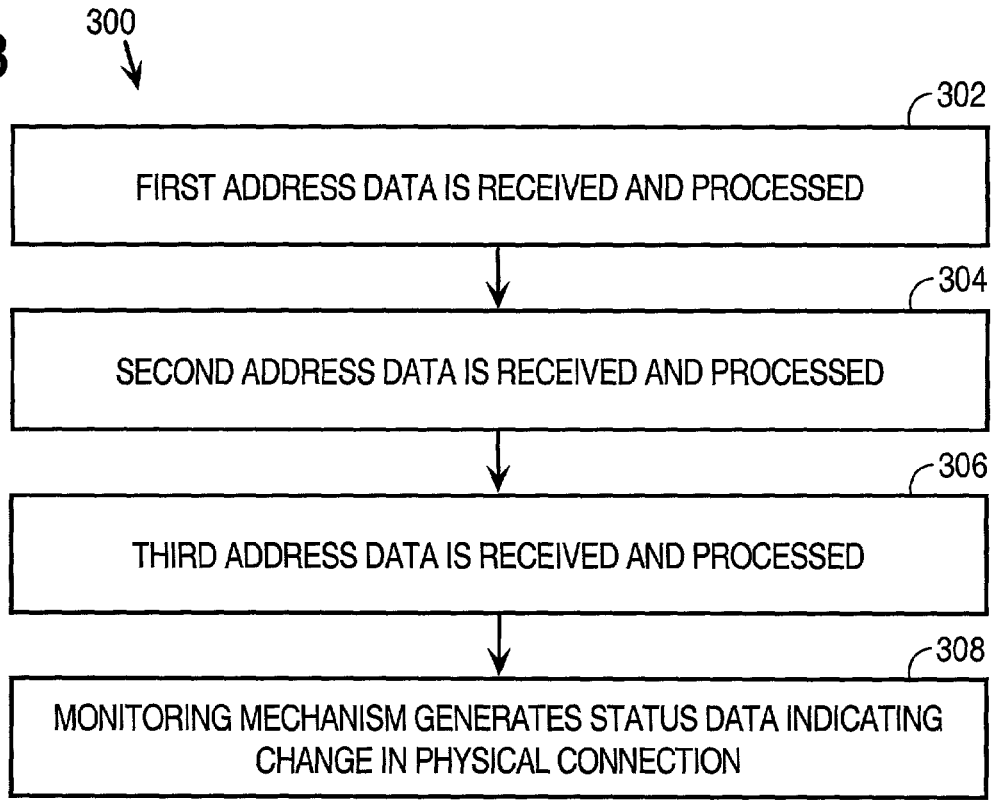
FIG. 3 is a flow diagram that depicts another approach for tracking IP telephony devices in a network.

FIG. 3 is a flow diagram 300 that depicts this approach in the context that IP phone 112 is disconnected from network 102. In step 302, monitoring mechanism 122 receives first address data that indicates the physical connection of IP phone 112 to network 102 at a first point in time. In this example, IP phone 112 is connected to network switch 104 and the first address data specifies an address of network switch 104 to which IP phone 112 is physically connected.

In step 304, monitoring mechanism receives second address data that indicates the physical connection of IP phone 112 to network 102 at a second point in time that is after the first point in time. In the present example, on or before the second point in time, IP phone 112 has been disconnected from network switch 104. Thus, the second address data reflects this condition. According to one embodiment, upon receipt of the second address data, monitoring mechanism 122 does not immediately generate status data indicating that IP phone 112 has been disconnected from network switch 104 (and network 102). Instead, monitoring mechanism 122 waits to examine additional address data at a later point in time to confirm that IP phone 112 has been disconnected from network switch 104.

In step 306, monitoring mechanism receives third address data that indicates the physical connection of IP phone 112 to network 102 at a third point in time that is after both the first and second points in time. In the present example, the third address data indicates that, at the third point in time, IP phone 112 is still disconnected from network switch 104. Monitoring mechanism 122 can now confirm that IP phone 112 is disconnected from network switch 104. Accordingly, in step 308, monitoring mechanism 122 generates status data to indicate that IP phone 112 has been disconnected from network switch 104. Monitoring mechanism 122 may also provide the status data to call manager 124 for processing.

According to this approach, monitoring mechanism 122 waits to generate the status data until processing of the third address data confirms that IP phone 112 has been disconnected from network switch 104. This reduces the likelihood of generating a false status due to an intermittent disconnection. The third data may be generated by network switch 104 according to its normal schedule for generating data. Alternatively, monitoring mechanism 122 may wait a specified amount of time after receiving and processing the second address data and then request the third address data from network switch 104.

IV. IP Phone Configuration Data and Registration Requests

In addition to storing address data for IP telephony devices, monitoring mechanism 122 may be configured to store other configuration data for IP telephony devices. Examples of other configuration data include, without limitation, IP address data, MAC address data and IP address data for call manager 124. The configuration data may be provided to call manager 124 by monitoring mechanism 122 upon request, or in connection with notifications made by monitoring mechanism 122 that one or more physical connections of IP telephony devices have changed. Call manager 124 may also maintain part or all of the configuration data for IP telephony devices. Alternatively, call manager 124 may maintain configuration data for IP telephony devices and the invention is not limited to either monitoring mechanism 122 or call manager 124 maintaining configuration data.

Configuration data may also include identification data that uniquely identifies an IP telephony device. For example, IP telephony devices may be configured with a permanent unique identifier that cannot be changed. This identifier may then be used to unambiguously associate configuration data with an IP telephony device. This is particularly useful in determining whether configuration data for an IP telephony device has been changed in unauthorized manner.

For example, an unauthorized party may disconnect IP phone 112 from network switch 104, change the configuration data of IP phone 112 and then reconnect IP phone 112 at another location in network 102, for example to network switch 108. In this situation, although the configuration data of IP phone 112 has been changed, the permanent unique identifier cannot be changed. As a result, monitoring mechanism 122 would be able to detect that IP phone 112 had been disconnected from network switch 104 and reconnected to network switch 108.

Furthermore, monitoring mechanism 122 would be able to detect that the configuration data for IP phone 112 had also been changed in an attempt to avoid detection. Monitoring mechanism 122 would then notify call manager 124, so that administrative personnel could be alerted.

V. Implementation Mechanisms

The approach described herein for tracking IP telephony devices is applicable to a variety of contexts and implementations and the invention is not limited to any particular context or implementation. For example, the approach may be implemented as a stand-alone mechanism or integrated into a network management application.

Monitoring mechanism 122 has been described herein primarily in the context of a mechanism that is disposed external to network 102. The invention is not limited to this context and monitoring mechanism 122 may be implemented internal to network 102 as a stand-alone network component, or integrated into another network component, such as a switch, router, hub or gateway.

For purposes of explanation, the functionality of monitoring mechanism 122 has been depicted in the figures and described as being separate from call manager 124, although this is not a requirement of the invention. For example, the functionality of monitoring mechanism 122 may be integrated into call manager 124, depending upon the requirements of a particular application. Furthermore, embodiments many be implemented in computer hardware, computer software, or a combination of computer hardware and software and the invention is not limited to any particular computer hardware or software configuration.

Although described herein primarily in the context of tracking IP phones, the approach is applicable to any type of IP telephony device. Examples of other types of IP telephony devices include, without limitation, Personal Digital Assistants (PDAs), laptop computers, videophones and other mobile devices.

Figure 4:
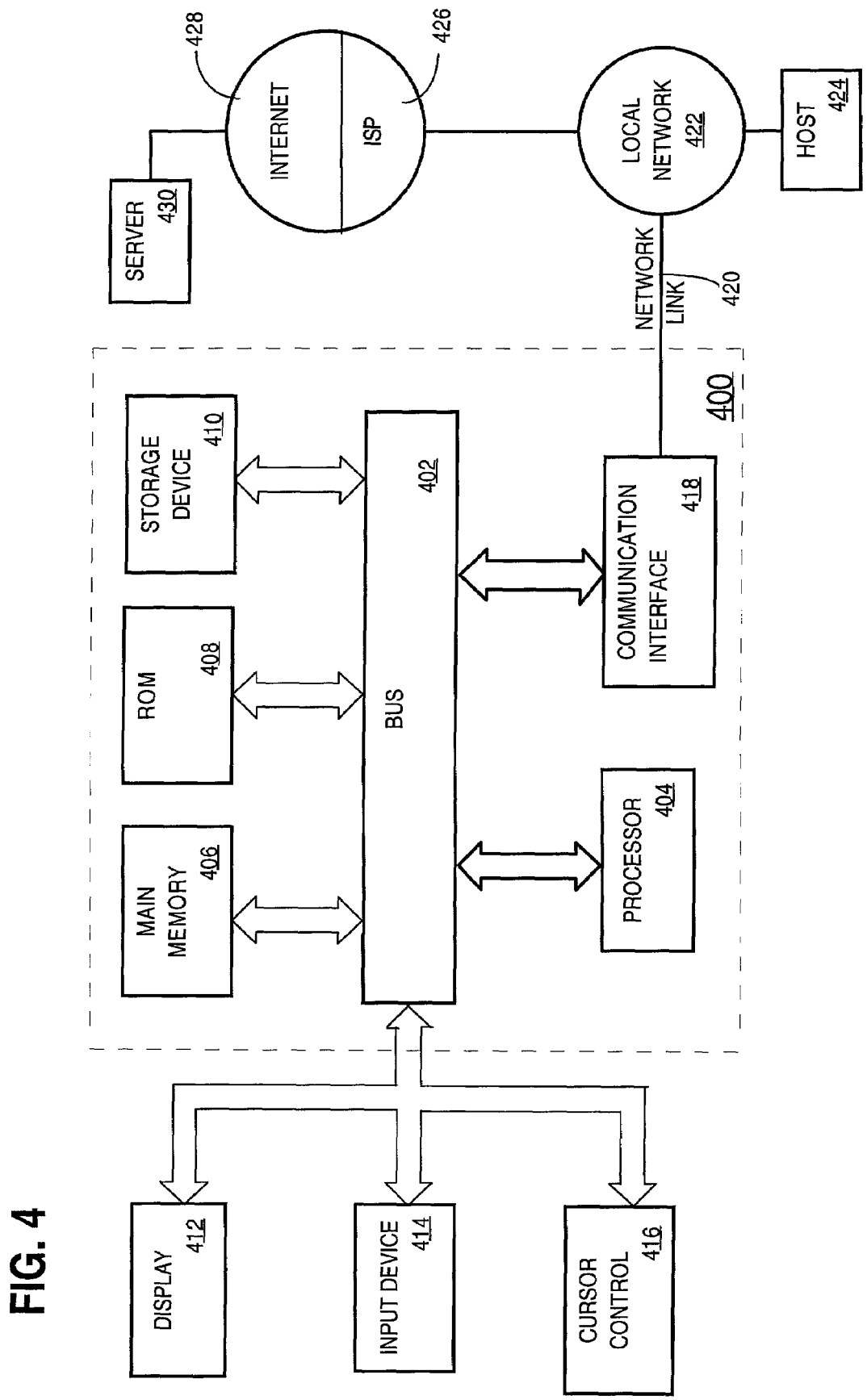
FIG. 4 is a block diagram that depicts a computer system on which embodiments of the present invention may be implemented.

FIG. 4 is a block diagram that illustrates a computer system 400 upon which an embodiment may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for tracking IP telephony devices. According to one embodiment, tracking IP telephony devices is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. One or more processors in a multi-processing arrangement may also be employed to execute the sequences of instructions contained in main memory 406. In alternative embodiments, hard-wired circuitry may be used in place of or in combination with software instructions to implement the invention. Thus, embodiments are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector coupled to bus 402 can receive the data carried in the infrared signal and place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the Internet 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for tracking IP telephony devices as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for tracking an Internet Protocol (IP) telephony device connected to a network, the method comprising the steps of:
    receiving first address data that specifies a physical connection of the IP telephony device to the network at a first point in time;
    receiving second address data that specifies a physical connection of the IP telephony device to the network at a second point in time that is after the first point in time;
    determining, based upon the first address data and the second address data, whether the physical connection of the IP telephony device to the network has changed overtime; and
    if, based upon the determining step, the physical connection of the IP telephony device to the network has changed over time, then generating status data that indicates that the physical connection of the IP telephony device to the network has changed over time.

2. The method as recited in claim 1, wherein the first address data specifies a first switch address for the IP telephony device and the second address data specifies a second switch address for the IP telephony device.

3. The method as recited in claim 1, wherein the first address data specifies a first port for the IP telephony device and the second address data specifies a second port for the IP telephony device.

4. The method as recited in claim 1, wherein the first address data specifies a first switch address and a first port for the IP telephony device and the second address data specifies a second specifies address and a second port for the IP telephony device.

5. The method as recited in claim 1, wherein the first address data and second address data are received from a network switch to which the IP telephony device is physically connected.

6. The method as recited in claim 5, wherein the first address data and the second address data are automatically provided by the network switch.

7. The method as recited in claim 5, further comprising requesting the first address data and the second address data from the network switch.

8. The method as recited in claim 5, wherein the status data further specifies how the physical connection of the IP telephony device to the network has changed over time.

9. The method as recited in claim 1, wherein if the second address data indicates that the IP telephony device is no longer physically connected to the network, then including in the status data, data that indicates that the IP telephony device is no longer physically connected to the network.

10. The method as recited in claim 1, wherein:
    the method further comprises receiving third address data that specifies a physical connection of the IP telephony device to the network at a point in time that is after the second point in time, and
    the status data that indicates that the physical connection of the IP telephony device to the network has changed over time is generated only if both the second address data and the third address data indicate, relative to the first address data, that the physical connection of the IP telephony device to the network has changed over time.

11. A computer-readable medium for tracking an Internet Protocol (IP) telephony device connected to a network, the computer-readable medium carrying one or more sequences of instructions which, when executed by one or more processors, cause the one or more processors to perform the steps of:
    receiving first address data that specifies a physical connection of the IP telephony device to the network at a first point in time;
    receiving second address data that specifies a physical connection of the IP telephony device to the network at a second point in time that is after the first point in time;
    determining, based upon the first address data and the second address data, whether the physical connection of the IP telephony device to the network has changed overtime; and
    if, based upon the determining step, the physical connection of the IP telephony device to the network has changed over time, then generating status data that indicates that the physical connection of the IP telephony device to the network has changed over time.

12. The computer-readable medium as recited in claim 11, wherein the first address data specifies a first switch address for the IP telephony device and the second address data specifies a second switch address for the IP telephony device.

13. The computer-readable medium as recited in claim 11, wherein the first address data specifies a first port for the IP telephony device and the second address data specifies a second port for the IP telephony device.

14. The computer-readable medium as recited in claim 11, wherein the first address data specifies a first switch address and a first port for the IP telephony device and the second address data specifies a second specifies address and a second port for the IP telephony device.

15. The computer-readable medium as recited in claim 11, wherein the first address data and second address data are received from a network switch to which the IP telephony device is physically connected.

16. The computer-readable medium as recited in claim 15, wherein the first address data and the second address data are automatically provided by the network switch.

17. The computer-readable medium as recited in claim 15, further comprising one or more additional instructions which, when executed by the one or more processors, cause the one or more processors to perform the step of requesting the first address data and the second address data from the network switch.

18. The computer-readable medium as recited in claim 15, wherein the status data further specifies how the physical connection of the IP telephony device to the network has changed over time.

19. The computer-readable medium as recited in claim 11, wherein if the second address data indicates that the IP telephony device is no longer physically connected to the network, then including in the status data, data that indicates that the IP telephony device is no longer physically connected to the network.

20. The computer-readable medium as recited in claim 11, wherein:
the computer-readable medium further comprises one or more additional instructions which, when executed by the one or more processors, cause the one or more processors to perform the step of receiving third address data that specifies a physical connection of the IP telephony device to the network at a point in time that is after the second point in time, and
the status data that indicates that the physical connection of the IP telephony device to the network has changed over time is generated only if both the second address data and the third address data indicate, relative to the first address data, that the physical connection of the IP telephony device to the network has changed over time.

21. A computer system for tracking an Internet Protocol (IP) telephony device connected to a network, the computer system comprising a memory that includes one or more sequences of instructions which, when executed by one or more processors, cause the one or more processors to perform the steps of:
receiving first address data that specifies a physical connection of the IP telephony device to the network at a first point in time;
receiving second address data that specifies a physical connection of the IP telephony device to the network at a second point in time that is after the first point in time;
determining, based upon the first address data and the second address data, whether the physical connection of the IP telephony device to the network has changed over time; and
if, based upon the determining step, the physical connection of the IP telephony device to the network has changed over time, then generating status data that indicates that the physical connection of the IP telephony device to the network has changed over time.

22. The computer system as recited in claim 21, wherein the first address data specifies a first switch address for the IP telephony device and the second address data specifies a second switch address for the IP telephony device.

23. The computer system as recited in claim 21, wherein the first address data specifies a first port for the IP telephony device and the second address data specifies a second port for the IP telephony device.

24. The computer system as recited in claim 21, wherein the first address data specifies a first switch address and a first port for the IP telephony device and the second address data specifies a second specifies address and a second port for the IP telephony device.

25. The computer system as recited in claim 21, wherein the first address data and second address data are received from a network switch to which the IP telephony device is physically connected.

26. The computer system as recited in claim 25, wherein the first address data and the second address data are automatically provided by the network switch.

27. The computer system as recited in claim 25, wherein the memory further comprises one or more additional instructions which, when executed by the one or more processors, cause the one or more processors to perform the step of requesting the first address data and the second address data from the network switch.

28. The computer system as recited in claim 25, wherein the status data further specifies how the physical connection of the IP telephony device to the network has changed over time.

29. The computer system as recited in claim 21, wherein if the second address data indicates that the IP telephony device is no longer physically connected to the network, then including in the status data, data that indicates that the IP telephony device is no longer physically connected to the network.

30. The computer system as recited in claim 21, wherein:
the memory further comprises one or more additional instructions which, when executed by the one or more processors, cause the one or more processors to perform the step of receiving third address data that specifies a physical connection of the IP telephony device to the network at a point in time that is after the second point in time, and
the status data that indicates that the physical connection of the IP telephony device to the network has changed over time is generated only if both the second address data and the third address data indicate, relative to the first address data, that the physical connection of the IP telephony device to the network has changed over time.

* * * * *